(12) United States Patent
Kim

(10) Patent No.: US 7,526,194 B2
(45) Date of Patent: Apr. 28, 2009

(54) METHOD AND APPARATUS FOR ADJUSTING EXPOSURE FOR A CAMERA

(75) Inventor: Pil-Sang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 11/175,702

(22) Filed: Jul. 5, 2005

(65) Prior Publication Data

US 2006/0008267 A1    Jan. 12, 2006

(30) Foreign Application Priority Data

Jul. 6, 2004    (KR)    ............... 10-2004-0052360

(51) Int. Cl.
G03B 7/00 (2006.01)
H04N 5/228 (2006.01)
H04N 5/235 (2006.01)

(52) U.S. Cl. ............... 396/213; 348/221.1; 348/229.1; 348/208.12; 348/E5.035; 348/E5.037; 348/E5.041

(58) Field of Classification Search ............ 396/213, 396/374; 348/221.1, 229.1, 208.12, E5.035, 348/E5.037, E5.041

See application file for complete search history.

(56) References Cited

U.S. PATENT DOCUMENTS

| 5,486,893 A * | 1/1996 | Takagi ............... 396/147 |
| 7,110,666 B2 * | 9/2006 | Abe et al. ............ 396/59 |
| 2003/0098914 A1 * | 5/2003 | Easwar ............... 348/229.1 |
| 2003/0146372 A1 | 8/2003 | Hsish et al. |
| 2004/0041928 A1 | 3/2004 | Hirakoso et al. |

FOREIGN PATENT DOCUMENTS

| CN | 1430402 | 7/2003 |
| EP | 1 322 109 A2 | 6/2003 |
| JP | 2000-092380 | 3/2000 |
| JP | 2001-285684 | 10/2001 |
| JP | 2001-352488 | 12/2001 |
| JP | 2002-300447 | 11/2002 |
| JP | 2002-344598 | 11/2002 |
| JP | 2004-173172 | 6/2004 |
| JP | 2004165999 | 6/2004 |

* cited by examiner

*Primary Examiner*—Rochelle-Ann Blackman
(74) *Attorney, Agent, or Firm*—Lee, Hong, Degerman, Kang & Waimey

(57) ABSTRACT

A camera phone and method for automatically adjusting the exposure of a camera in order to improve image of an object is previewed with a current exposure, data is extracted from frames of the previewed image and analyzed to determine illumination of the previewed object, and an exposure is adjusted according to the analyzed result.

40 Claims, 10 Drawing Sheets

METHOD AND APPARATUS FOR ADJUSTING EXPOSURE FOR A CAMERA

CROSS-REFERENCE TO RELATED APPLICATIONS

Pursuant to 35 U.S.C. § 119(a), this application claims the benefit of earlier filing date and right of priority to Korean Application No. 52360/2004, filed on Jul. 6, 2004, the contents of which is hereby incorporated by reference herein in its entirety:

BACKGROUND OF THE INVENTION

1. Field of the Invention

The present invention relates to a camera, and particularly, to a method and apparatus in which an exposure is automatically adjusted for improving an image quality for a camera phone.

2. Description of the Related Art

Mobile communication systems using mobile communication terminals provide multimedia communication services capable of sending and receiving images as well as audio signals or text messages. According to recent trends in the mobile communication market, mobile communication terminals with built-in cameras have been developed that allow a mobile communication terminal to be used for the multimedia communication and are being used by many mobile communication service subscribers.

A mobile communication terminal with built-in camera (hereinafter, referred to as a camera phone) is a mobile communication terminal having a small digital camera either built-in or attachable thereto. A camera phone allows an object to be photographed, with the photographed image stored in a memory embedded in the mobile communication terminal and further allows the photographic image to be sent to another user with whom a call is established.

In order to photograph an object with good image quality using a camera phone, it is important that illumination of the object is adequate. When the illumination of the object is not adequate, the digital photographic image may contain a noise, which results in degradation of the brightness and color sense of the image. When photographing an object under low illumination, degradation of the image quality may be more pronounced. Therefore, the ability to adjust an exposure appropriate to the corresponding illumination condition is required.

In order to ensure the appropriate illumination of an object, conventional camera phones have a separate optical sensor for measuring the quantity of light from the object in order to determine the illumination of the object. Manual adjustment of the exposure as a dark mode, or a night shot mode, which is an exposure appropriate for photographing an object at low illumination, is provided.

FIG. 1 is a flow chart illustrating a method for photographing an object under low illumination using a conventional camera phone. The method includes a manual adjustment of the illumination mode.

Referring to FIG. 1, a user first previews an object at the current exposure with the camera phone (S10) and determines whether to take a photograph based on the previewed image (S20). If the user determines that the previewed image is adequately illuminated, the object may be photographed (S70).

When photographing an object under low illumination, the user may manually adjust an exposure as a dark mode (S30). If the exposure is not manually adjusted, the user measures the quantity of light of the object using an optical sensor and checks the corresponding illumination level of the previewed image (S40).

If the previewed image is determined to have an illumination lower than a certain level (S50), the user manually adjusts the exposure as a dark mode, or a night shot mode, to increase the exposure time (S60). The manual adjustment is performed using an input/output unit of the camera phone.

The user previews the object in the exposure (S50) and photographs the object (S70) using the exposure (dark exposure mode) as adjusted in the step S60.

However, increasing the exposure time in step S60 causes the object to be photographed by the mobile terminal at a decreased number of frames per second. For example, if a previewed image corresponds to photographing at 30-frames per second and the 30 FPS setting is changed to 15 FPS (for photographing at 15 frames per second) because the illumination value checked by measuring the quantity of light is determined as low illumination, the exposure time is doubled (lengthened). As a result, an image with good quality can be photographed because the exposure time setting with respect to the illumination of the object has an adequate value.

The conventional method for improving an image quality of a camera phone is problematic in that the user must manually adjust the exposure and a separate sensor for measuring the quantity of light of the object is required. In addition, when the object moves, it is difficult to capture and photograph an instantaneous movement by manually adjusting the exposure.

Therefore, there is a need for a camera phone that facilitates automatic adjustment of the exposure used to photograph an object. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to a method and apparatus for automatically adjusting an exposure of a camera quickly and conveniently for photographing an object. To achieve this and other objects and advantages and in accordance with the purpose of the present invention, as embodied and broadly described herein, there is provided an apparatus and method for automatically adjusting an exposure of a camera by which an image of a object can be photographed by previewing an image of the object with a current exposure, extracting data from the frames of the previewed object, analyzing the extracted data, and adjusting an exposure according to the analyzed result.

In one aspect of the present invention, a method is provided for adjusting an exposure of a camera for photographing an image of an object. The method includes previewing an image of the object with a current exposure such that one or more frames are provided, extracting data related to illumination of the object from at least one of the frames of the previewed image, determining illumination of the object according to the data, and adjusting the exposure according to the determined illumination.

Preferably, the data comprises a brightness level distribution of the previewed image, an electronic shutter speed of a camera image sensor or a gain value of the camera image sensor. It is contemplated that the data may be extracted from each of the frames of the previewed image and the illumination of each frame determined or the data may be extracted from a subset of the frames of the previewed image and illumination of each of the subset of frames determined.

Preferably, the illumination of the object is determined according to one or more threshold values as either bright, dark or maintain current exposure. It is contemplated that the threshold values may be set according to a current exposure of the previewed image.

It is contemplated that multiple data types related to illumination of the object may be extracted from the frames of the previewed image and illumination of the object determined for at least one of the frames according to each of the data types. Preferably, the multiple data types are extracted from a plurality of frames and illumination of the object is determined for a plurality of the extracted frames according to each of the data types. It is contemplated that the illumination of the object according to the multiple data types may be determined for each of the frames from which the data is extracted or for a subset of the frames from which the data is extracted.

It is contemplated that the exposure be may be adjusted if the illumination determined according to each of the multiple data types coincide for at least one frame of the previewed image. It is further contemplated that the exposure is maintained if the illumination determined according to each of the multiple data types does not coincide for at least one frame of the previewed image.

Preferably, the number of times that the illumination determined according to each of the multiple data types coincides for a given frame is determined with the exposure adjusted if the determined number of times is greater than or equal to a predetermined number and a current exposure is maintained if the determined number of times is less than the predetermined number. It is contemplated that the exposure may be adjusted if the determined number of times that the illumination determined according to each of the multiple data types coincides for consecutive frames is greater than or equal to a predetermined number.

Preferably, the multiple data types include a brightness level distribution of the previewed image, an electronic shutter speed of a camera image sensor and a gain value of the camera image sensor. One determination of the illumination of the object as one of bright, dark and maintain current exposure is performed for at least one of the frames from which multiple data types are extracted according to the brightness level distribution using a first threshold value and a second determination of the illumination of the object as one of bright, dark and maintain current exposure is performed for at least one of the frames from which multiple data types are extracted according to the electronic shutter speed and gain value of the camera image sensor using a second threshold value. A count is incremented whenever the first determination matches the second determination for any frame. The exposure is adjusted if the count is greater than or equal to a predetermined number and the exposure is maintained if the count is less than the predetermined number.

In another aspect of the present invention, a method is provided for adjusting an exposure of a camera for photographing an image of an object. The method includes previewing an image of the object with a current exposure such that one or more frames are provided, extracting a first and second illumination indicator from at least one of the frames, determining a first illumination of the object according to the first illumination indicator, determining a second illumination of the object according to the second illumination indicator, maintaining a count of the number of times that the determined first illumination matches the determined second illumination for any frame, and adjusting the exposure according to the count.

Preferably, the first illumination indicator is a brightness level distribution and the first illumination indicator is analyzed according to a brightness level distribution of each pixel of at least one frame using a first preset threshold value. Preferably, the second illumination indicator is an electronic shutter speed and gain value of a camera image sensor and the second illumination indicator is analyzed according to an electronic shutter speed value and gain value of a camera image sensor corresponding to at least one frame using a second preset threshold value. It is contemplated that the first threshold value and the second threshold value may be set differently according to a current exposure of the previewed image.

Preferably, the first illumination and the second illumination are determined as either bright, dark or maintain current exposure. It is contemplated that the first illumination indicator and second illumination indicator may be extracted from each of the frames of the previewed image, with the first illumination and second illumination determined for each of the frames.

It is contemplated that the exposure may be adjusted if the count is greater than or equal to a predetermined number and a current exposure is maintained if the count is less than the predetermined number. Preferably, a count is maintained of the number of times that the determined first illumination matches the determined second illumination in consecutive frames and the exposure is adjusted if the count is greater than or equal to a predetermined number.

In yet another aspect of the present invention, a camera phone is provided. The camera phone includes a memory device for storing images of an object, an LCD for displaying information related to a photographed object, an input/output unit for allowing a user to input or receive information related to the photographed object, and a microprocessor unit adapted to perform a program that facilitates the methods of the present invention.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for improving an image quality of a camera phone in which the illumination of an object to be photographed is automatically checked and an exposure is automatically adjusted. Although the present invention is illustrated with respect to a camera phone, it is contemplated that the present invention may be utilized with other communication devices and digital cameras in general for improving the image quality when an object is photographed under a condition where the illumination of the object is frequently changed by an influence of the peripheral environment.

In general, when photographing an object by using a camera phone, the user measures the quantity of light using a sensor in order to manually adjust an exposure. The present invention provides a method for improving the image quality of a photographed object by automatically adjusting the exposure in accordance with a predetermined algorithm that analyzes a brightness level distribution, electronic shutter speed values and brightness gain values of a camera sensor in order to adjust an exposure according to the illumination of the object.

A camera phone for implementing a method of the present invention includes a microprocessor unit (MPU) executing a program for performing and controlling operation of an algorithm to implement the method, a memory device for storing the algorithm and images, and basic hardware including such devices as an LCD and input/output unit of key buttons. Although the invention is described with regard to photographing an object, it will be understood by those knowledgeable in the field of the invention that a sequential series of still images may be photographed in succession to obtain a motion video comprised of any number of individual still frames.

Figure 1:
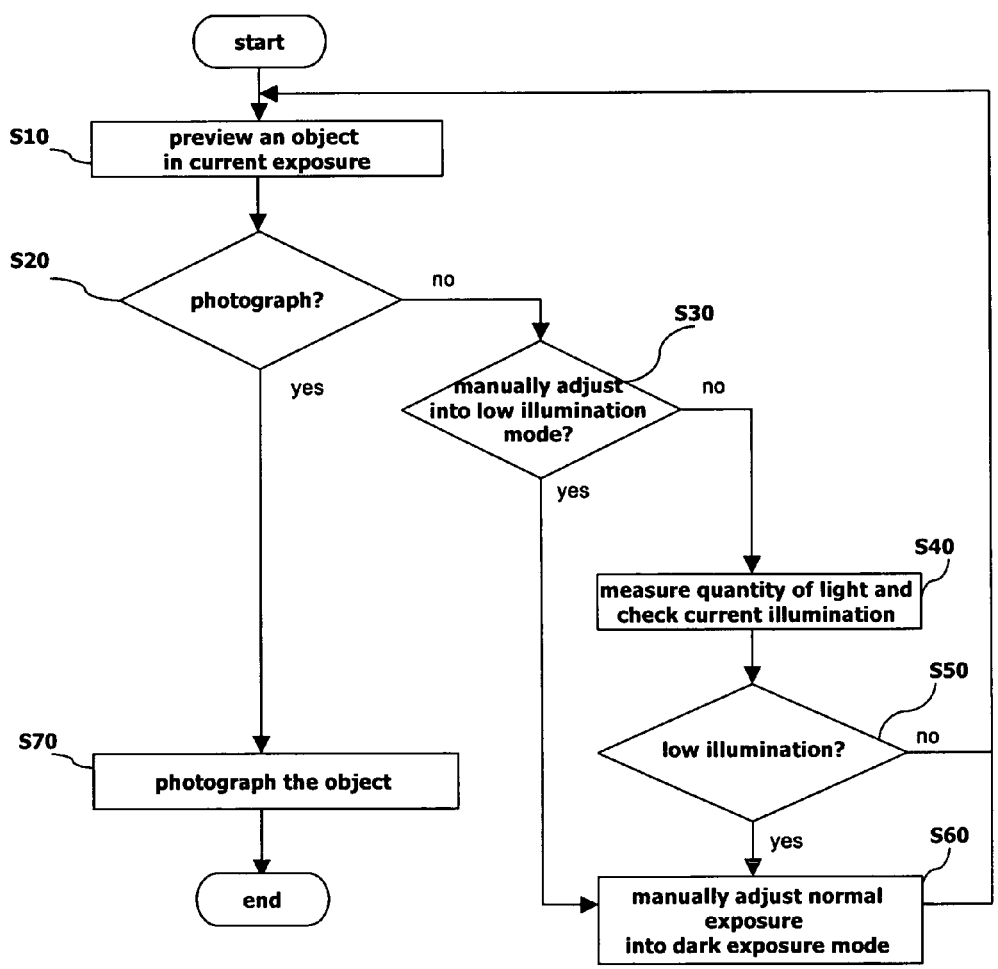
FIG. 1 is a flow chart illustrating a conventional method for improving an image quality of a camera phone.
Figure 2:
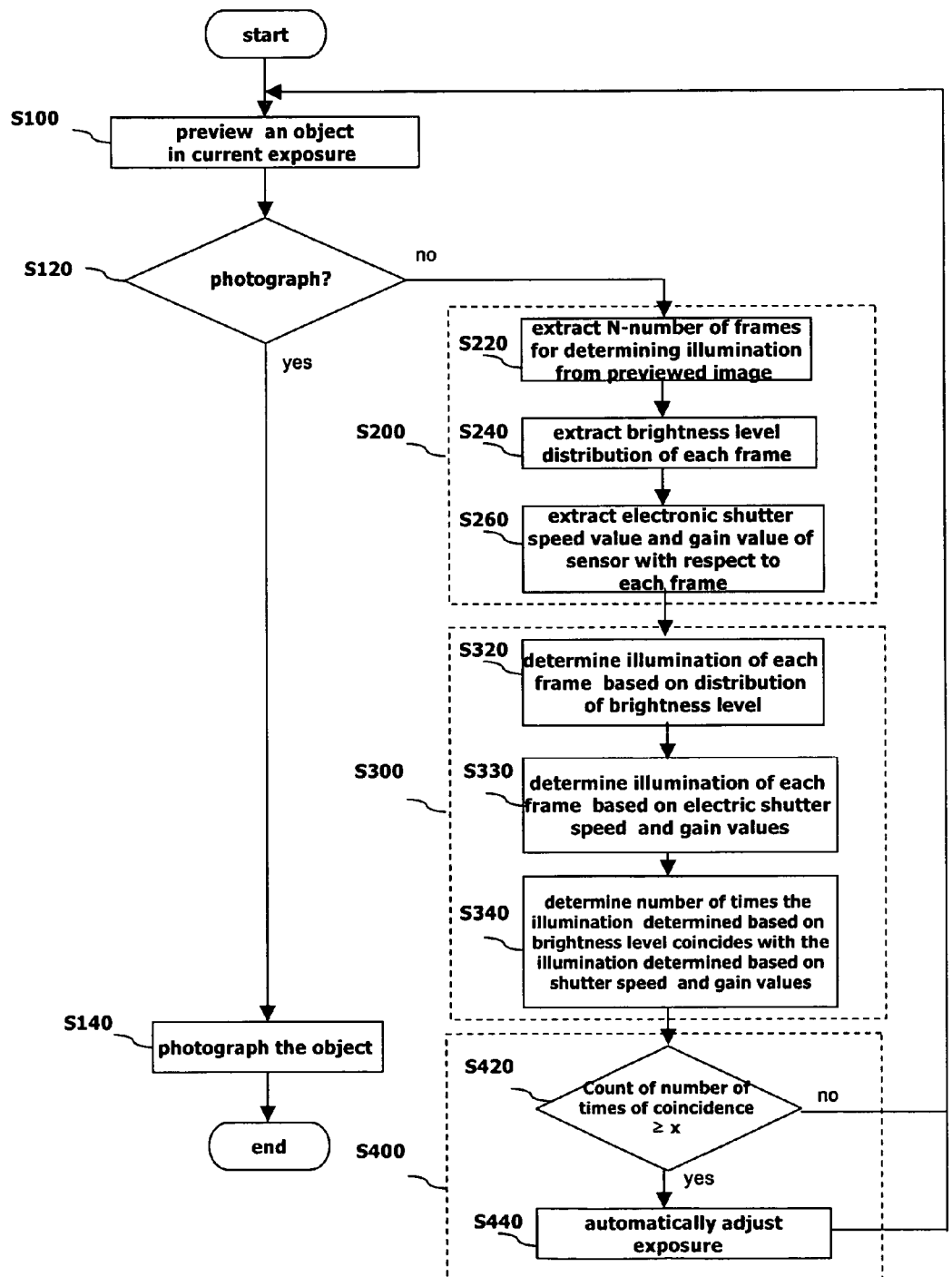
FIG. 2 is a flow chart illustrating a method for improving an image quality of a camera phone according to the present invention.
Figure 4:
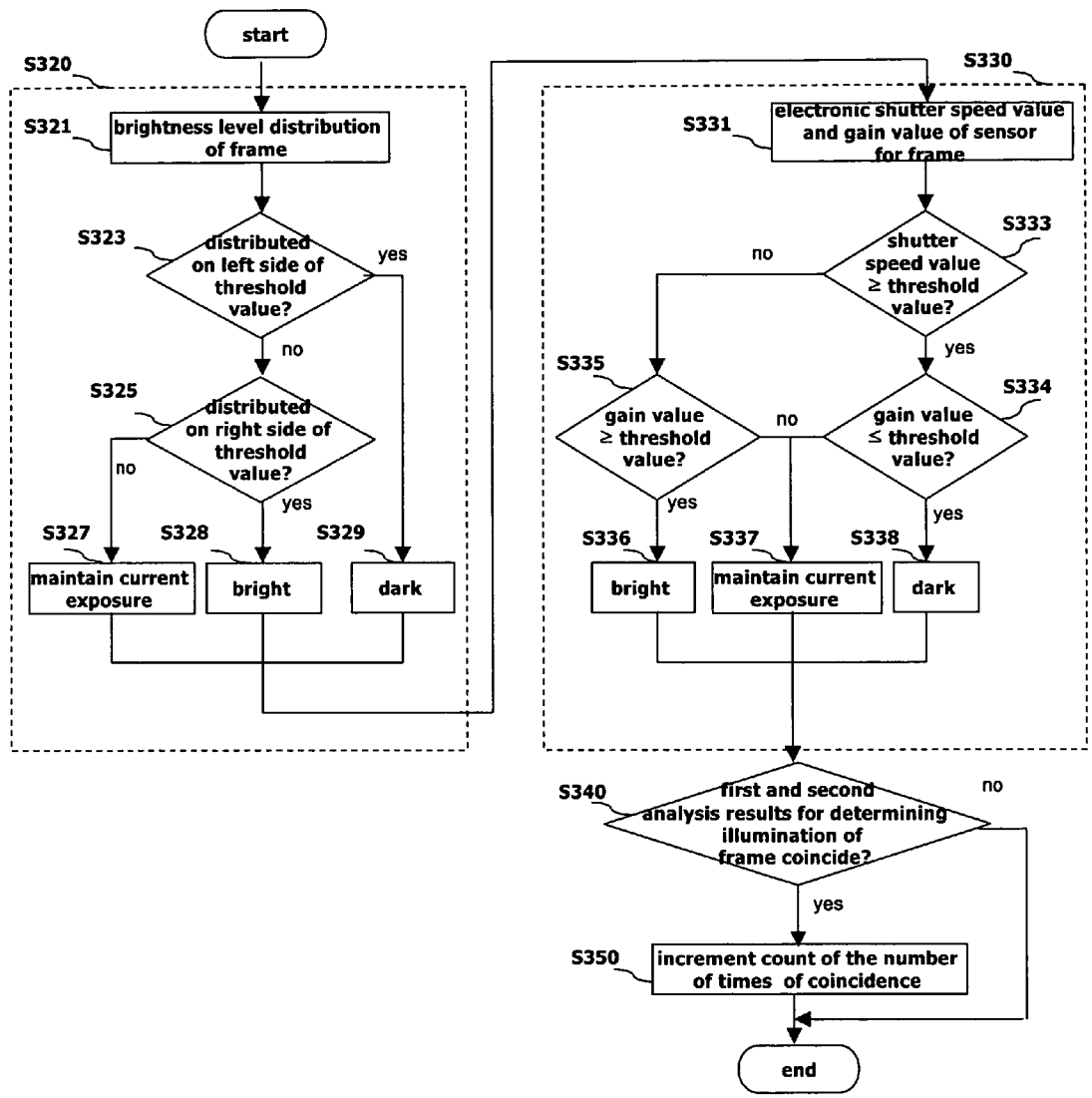
FIG. 4 is a flow chart illustrating a method for analyzing the extracted frames and a determining illumination according to FIG. 2.

FIG. 2 is a flow chart illustrating a method for improving the image quality of a camera phone according to the present invention. FIG. 4 is a flow chart illustrating a subroutine for determining illumination of a frame extracted from a previewed image of an object according to the present invention.

Referring to FIGS. 2 and 4, when a user chooses an object to photograph, the camera of the camera phone previews the object in a current exposure under a control of the MPU (S100). The user then determinates whether to photograph the previewed object with the current exposure (S120).

When the user decides to not photograph the object with the current exposure in step S120, the MPU extracts frames from the previewed image for use in determining illumination of the previewed image (S220), determines the illumination of the extracted frames in multiple ways (S300), and adjusts an exposure of the camera phone if a predetermined criteria is met (S400). The brightness level distribution (S240) and electronic shutter speed values and gain values of the camera sensor (S260) for which illumination is determined may be extracted from each of the extracted frames or from a subset of the extracted frames.

As illustrated in FIGS. 2 and 4, the illumination is determined for each of a first frame to an Nth frame according to both a distribution of brightness levels of the previewed image (S320) and an electronic shutter speed and gain values of a camera sensor (S330). When determining illumination (S300), a threshold value is designated according to the current exposure.

If it is determined that the illumination according to the distribution of brightness levels (S320) coincides with the illumination according to the electronic shutter speed and gain values (S330) for a given frame (S340), the MPU increments a count (S350). When the number of coinciding illumination determinations is greater than or equal to a preset number (S420), the exposure is automatically adjusted to a corresponding exposure (S440). Preferably, the criteria for automatically adjusting the exposure is that the determination according to the distribution of brightness levels (S320) coincides with the illumination according to the electronic shutter speed and gain values (S330) for a predetermined number of consecutive image frames.

In step S440, the exposure of the camera phone is adjusted to an appropriate exposure under the control of the program executed by the MPU. The object is again previewed by the camera phone using the adjusted exposure (S120) and the user presses a corresponding key button of the input/output keypad unit to photographs the object (S140).

The present invention will be explained in more detail with reference to Tables 2 to 7 and FIGS. 2 to 10 along with an automatic exposure adjustment algorithm shown in Table 1 that is proposed as a preferred embodiment.

First, as shown in Table 1, four proposed exposures are set for an automatic exposure adjustment algorithm. Each exposure is divided according to the number of photographed frames per second (FPS) such that the exposure is set as a normal exposure and a long exposure, each mode including two sub-modes. As shown, the normal exposure is set as 30 FPS or 15 FPS and the long exposure is set as 7.5 FPS or 3.75 FPS (an extra long exposure). As shown in the algorithm of Table 1, there are ten available cases for adjusting from one exposure to the other exposures.

In the automatic exposure adjustment algorithm shown in Table 1, the exposure may be automatically adjusted form the normal exposure to the long exposure according to the illumination of the object, specifically from 30 FPS to 7.5 FPS (1), from 30 FPS to 3.75 FPS (2), from 15 FPS to 7.5 FPS (3), and from 15 FPS to 3.75 FPS (4). Conversely, the exposure may be automatically adjusted from the long exposure to the normal exposure according to the illumination of the object, specifically from 7.5 FPS to 30 FPS (6), from 3.75 FPS to 30 FPS (7), from 7.5 FPS to 15 FPS (8), and from 3.75 FPS to 15 FPS (9). Additionally, the exposure may be automatically adjusted to or from the long exposure to the extra long exposure according to the illumination of the object, specifically from 7.5 FPS to 3.75 FPS (5) or from 3.75 FPS to 7.5 FPS (10).

The case in which a currently set exposure is adjusted from the 15 FPS normal exposure to the 7.5 FPS long exposure will be explained. The current illumination of the object is assumed as 20 Lux.

TABLE 1

Automatic exposure adjustment algorithm

| Automatically adjusted Exposure | | Number of FPS automatically adjusted |
|---|---|---|
| Adjustment from normal exposure into long exposure | 1 | 30 FPS → 7.5 FPS |
| | 2 | 30 FPS → 3.75 FPS |
| | 3 | 15 FPS → 7.5 FPS |
| | 4 | 15 FPS → 3.75 FPS |
| Adjustment from long exposure into extra long exposure | 5 | 7.5 FPS → 3.75 FPS |
| Adjustment from long exposure into normal exposure | 6 | 30 FPS ← 7.5 FPS |
| | 7 | 30 FPS ← 3.75 FPS |
| | 8 | 15 FPS ← 7.5 FPS |
| | 9 | 15 FPS ← 3.75 FPS |
| Adjustment from extra long exposure into long exposure | 10 | 7.5 FPS ← 3.75 FPS |

Figure 3:
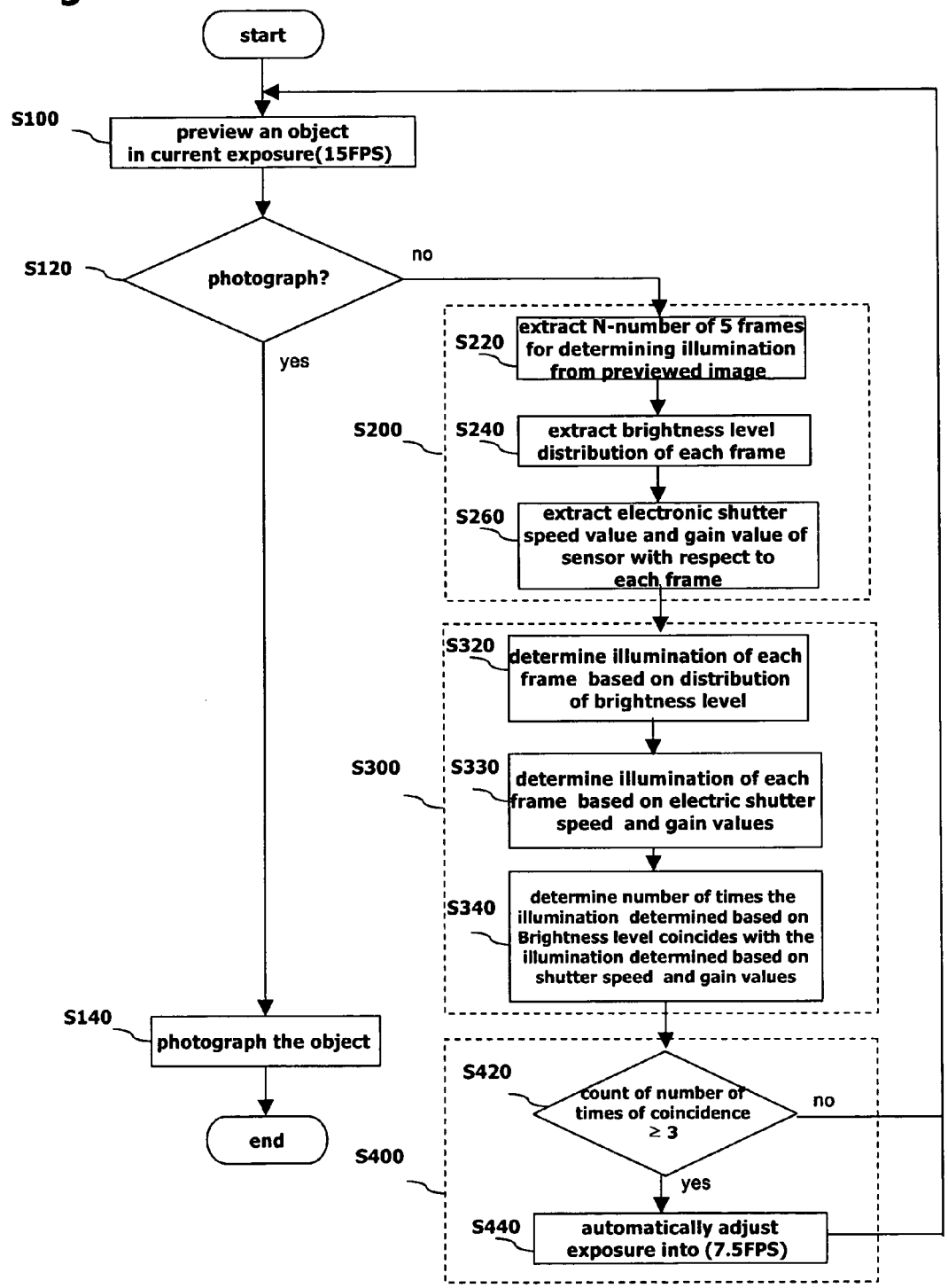
FIG. 3 is a flow chart illustrating a method for improving an image quality according to the present invention in which an exposure is adjusted from a current normal exposure (15 FPS) to a long exposure (7.5 FPS).

FIG. 3 illustrates a preferred embodiment of the method illustrated in FIG. 2 in which the current exposure is adjusted from the normal exposure (15 FPS) to the long exposure (7.5 FPS) in order to photograph an object. Therefore, the same reference symbols are used in FIG. 3 as were used in FIG. 2.

Referring to FIG. 3, the camera of the camera phone previews an object to be photographed in a currently set exposure (15 FPS normal exposure) and the program executed by the MPU extracts data required for determining the current illumination from the preview image (S200).

The extracted data corresponds to a brightness level distribution of the previewed image (S240) and electronic shutter speed values and gain values of a camera sensor (S260). This data may be extracted from each captured frame (15 frames per second) or from a subset of captured frames of the previewed image. As illustrated in FIG. 3, the data is extracted from five frames (frames 1, 4, 7, 10, and 13) among the fifteen frames in consideration of a load imposed upon the camera phone (S220).

Next, illumination is determined by analyzing the brightness level distribution (S240) and electronic shutter speed values and gain values (S260) stored in a register of the camera sensor for each of extracted frames 1, 4, 7, 10, and 13 (S300). Illumination is determined (S300) by analyzing the extracted data of each frame such that the illumination determination and analysis of the data is performed five times. FIG. 4 illustrates a subroutine for analyzing the data (S320 and S330) and determining illumination according to the extracted frames.

Table 2 (15 FPS), Table 3 (7.5 FPS) and Table 4 (3.75 FPS) are data for the illumination determination according to a distribution of brightness levels (S320) when the brightness level of a previewed object image is quantified into 0~255. The previewed image from which the data is extracted up to 192*144 pixels and the distribution of the brightness levels is extracted from 27648 total pixels of data. The vertical axis of each table corresponds to the brightness levels and the horizontal axis corresponds to the illumination of the object.

Figure 5:
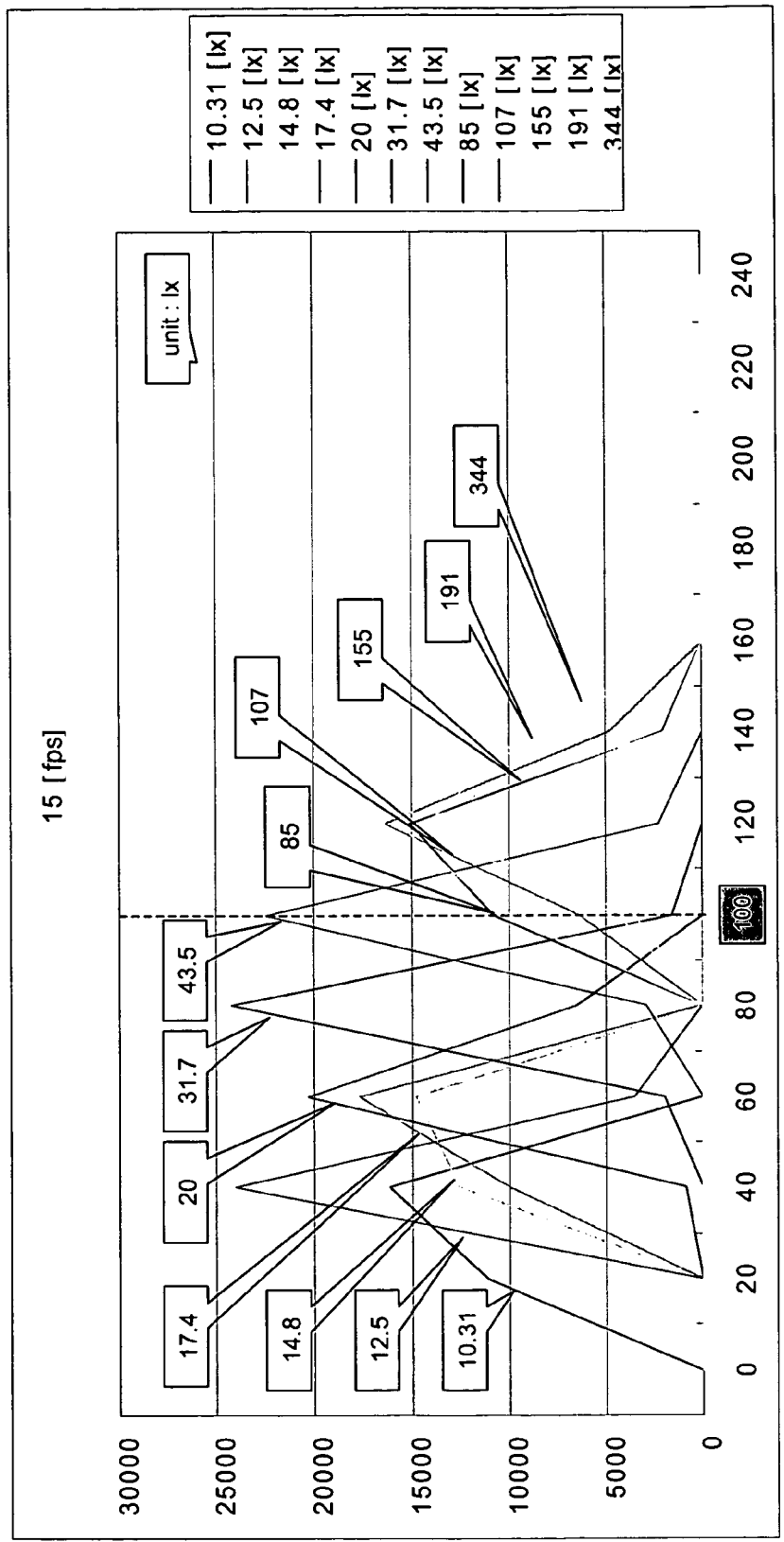
FIG. 5 is a distribution chart showing brightness levels according to illumination of a previewed image when a current exposure is 15 FPS.
Figure 6:
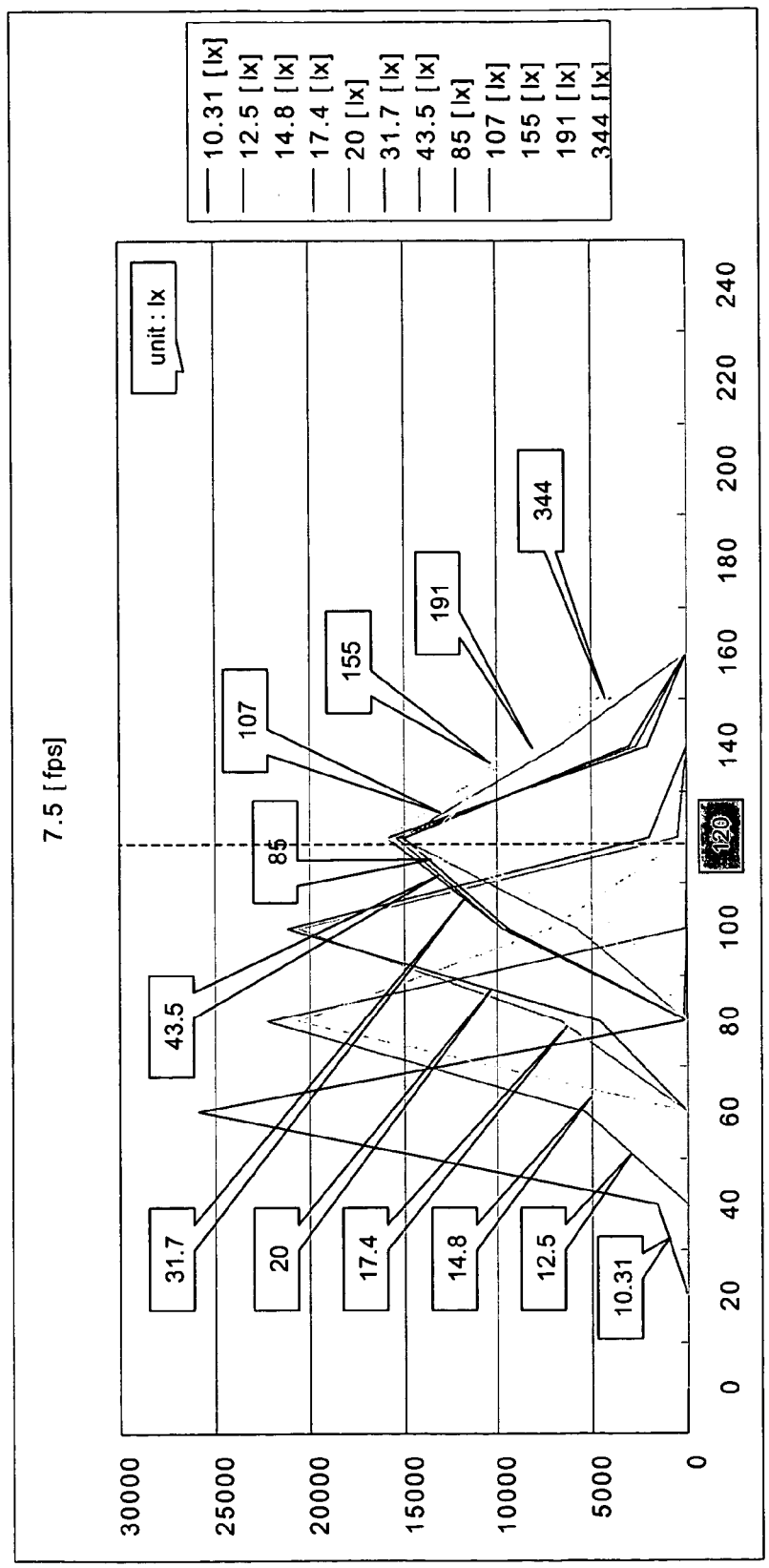
FIG. 6 is a distribution chart showing brightness levels according to illumination of a previewed image when a current exposure is 7.5 FPS.
Figure 7:
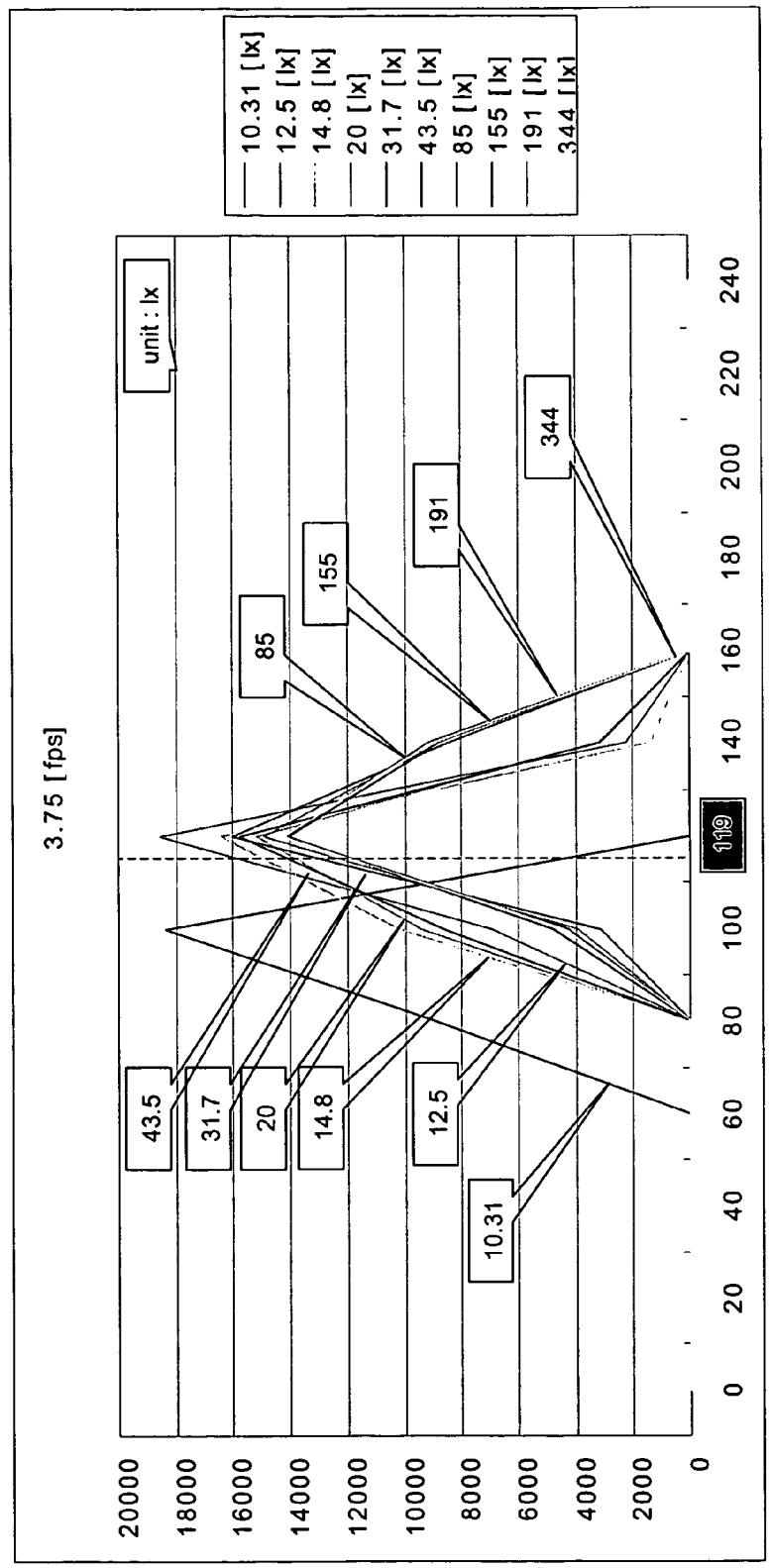
FIG. 7 is a distribution chart showing brightness levels according to illumination of a previewed image when a current exposure is 3.75 FPS.

FIGS. 5, 6, and 7 are distribution charts of brightness levels graphically illustrating, respectively, the data of Tables 2, 3, and 4. The determination of illumination according to a distribution of brightness levels (S320) will be explained in more detail with reference to Table 2 and FIGS. 4 and 5.

It is determined whether more than 83% of the brightness levels of the frame in the brightness level distribution of 27648 total pixel data are on the left side based on a threshold value of 100 of the preset current exposure (15 FPS) (S323). The threshold value of 100, as illustrated in FIG. 5, is obtained from the brightness level in which the pixel data is distributed the most when the illumination is 43.5 Lux. The illumination (43.5 Lux) corresponds to the brightness of the shadow under a desk generally placed at a position of a bright place.

Since the illumination (20 Lux) of the current object is darker than the corresponding illumination (43.5 Lux) of the threshold value 100, the brightness levels of the current (first) image frame are distributed on the left side as illustrated in FIG. 5. Therefore, the illumination of the current (first) image frame is determined as dark (S329), or low illumination. Conversely, in FIG. 5, if more than 83% of the brightness levels of the frame in the brightness level distribution of 27648 total pixel data are distributed on the right side based on the threshold value of 100 of the preset current exposure (15 FPS), the MPU determines that the illumination of the current image frame is bright (S328). In other cases, the current exposure is maintained (S327).

After completing the illumination determination according to a distribution of brightness levels (S320), the illumination (20 Lux) of the current object is determined by electronic shutter speed values and gain values of the camera sensor for the current (first) image frame (S330).

TABLE 2

Brightness level distribution of image according to illumination when previewing object under the current exposure (15 FPS)

[1×]

| Brightness Level | 10.31 | 12.5 | 14.8 | 17.4 | 20 | 31.7 | 43.5 | 85 | 107 | 155 | 191 | 344 |
|---|---|---|---|---|---|---|---|---|---|---|---|---|
| 0~19 | 0 | 0 | 0 | 0 | 0 | 0 | 0 | 0 | 0 | 0 | 0 | 0 |
| 20~39 | 11042 | 37 | 0 | 0 | 0 | 0 | 0 | 0 | 0 | 0 | 0 | 0 |

TABLE 2-continued

Brightness level distribution of image according to illumination when previewing object under the current exposure (15 FPS)

| Brightness Level | [1×] | | | | | | | | | | | |
|---|---|---|---|---|---|---|---|---|---|---|---|---|
| | 10.31 | 12.5 | 14.8 | 17.4 | 20 | 31.7 | 43.5 | 85 | 107 | 155 | 191 | 344 |
| 40~59 | 16171 | 24016 | 12541 | 9936 | 897 | 0 | 0 | 0 | 0 | 0 | 0 | 0 |
| 60~79 | 0 | 3522 | 14759 | 17687 | 20349 | 1968 | 0 | 0 | 0 | 0 | 0 | 0 |
| 80~99 | 0 | 0 | 0 | 0 | 6454 | 24211 | 2911 | 15 | 0 | 24 | 0 | 0 |
| 100~119 | 0 | 0 | 0 | 0 | 0 | 1580 | 22474 | 10714 | 6330 | 10274 | 3492 | 4384 |
| 120~139 | 0 | 0 | 0 | 0 | 0 | 0 | 2273 | 15081 | 16292 | 15630 | 15955 | 14140 |
| 140~159 | 0 | 0 | 0 | 0 | 0 | 0 | 0 | 2073 | 4785 | 1987 | 8080 | 9045 |
| 160~179 | 0 | 0 | 0 | 0 | 0 | 0 | 0 | 0 | 0 | 0 | 0 | 0 |
| 180~199 | 0 | 0 | 0 | 0 | 0 | 0 | 0 | 0 | 0 | 0 | 0 | 0 |
| 200~219 | 0 | 0 | 0 | 0 | 0 | 0 | 0 | 0 | 0 | 0 | 0 | 0 |
| 220~239 | 0 | 0 | 0 | 0 | 0 | 0 | 0 | 0 | 0 | 0 | 0 | 0 |
| 240~255 | 0 | 0 | 0 | 0 | 0 | 0 | 0 | 0 | 0 | 0 | 0 | 0 |

Figure 8:
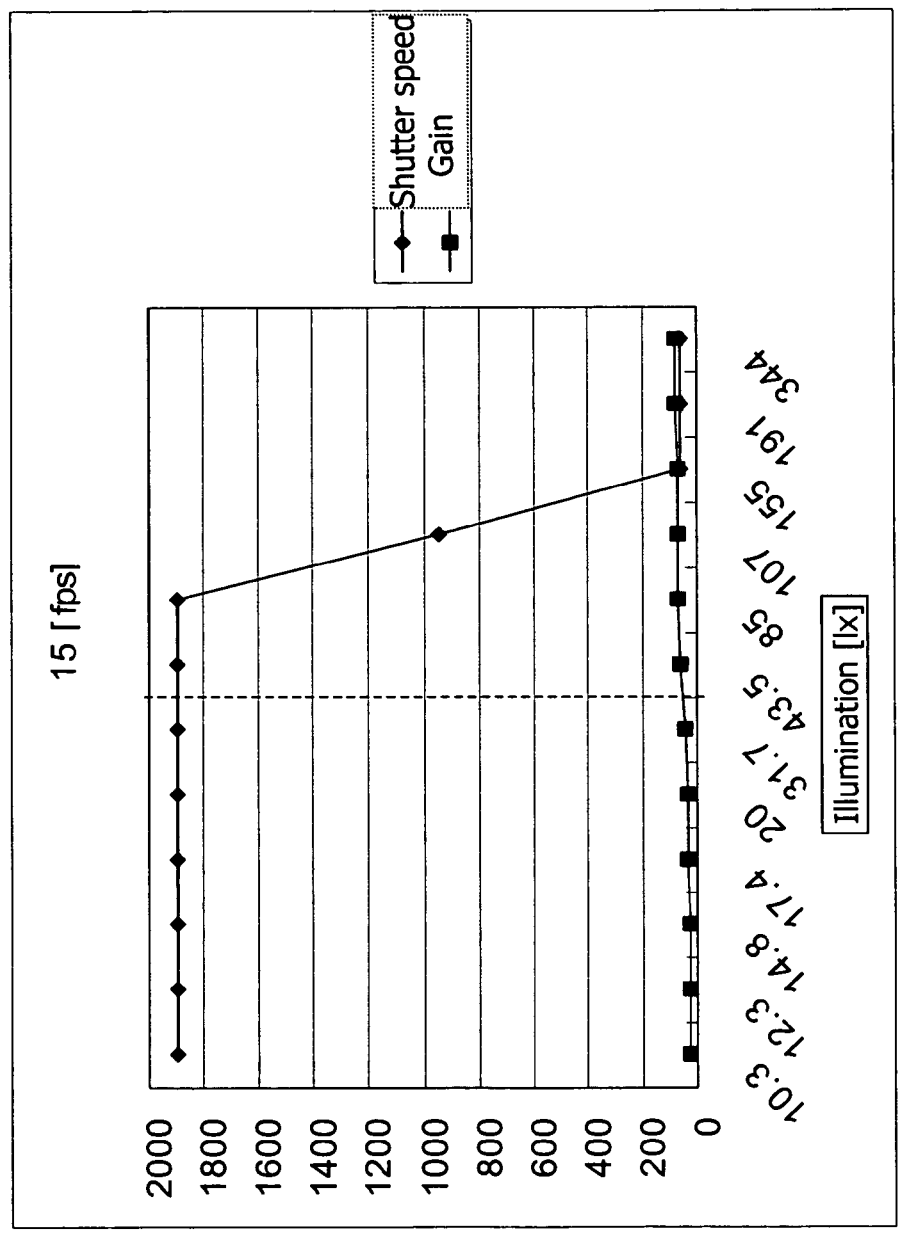
FIG. 8 is a graph showing electronic shutter speed values and gain values of a sensor according to illumination of a previewed image when a current exposure is 15 FPS.

Table 5 shows hexadecimal electronic shutter speed values and gain values that change according to the illumination based on characteristics of the camera sensor in the current exposure (15 FPS). FIG. 8 is a graph in which the horizontal axis represents illumination (Lux) and the vertical axis represents hexadecimal values adjusted into decimal values on the basis of the data shown in Table 5. The determination of the illumination according to the electronic shutter speed and gain values (S330) will be explained in more detail with reference to Table 5 and FIG. 8.

The MPU program compares each threshold value 0×768 and 0×39 preset according to the illumination (43.5 Lux) for the current exposure (15 FPS) with the electronic shutter speed value 0×768 (S333) and the gain value 0×21 (S334, S335) corresponding to the current (first) image frame for the current illumination (20 Lux), and determines whether the current (first) image frame is bright (S336), dark (S338) or adequate and to be maintained (S337).

value 0×768 is equal to or less than the threshold value 0×768, the current (first) image frame is determined as either dark (S338) or maintained (S337). Once the electronic shutter speed value is compared to the threshold value (S333), the gain value 0×21 is compared to the threshold value 0×39 (S334, S335).

If the shutter speed value was determined as greater than or equal to the threshold value in step S333, the current (first) image frame is determined as dark (S338) if the gain value is less than or equal to the threshold value and is determined as maintained (S337) if the gain value is greater than the threshold value. If the shutter speed value was determined as less than the threshold value in step S333, the current (first) image frame is determined as bright (S336) if the gain value is greater than or equal to the threshold value and is determined as maintained (S337) if the gain value is less than the threshold value. In the present example, since the electronic shutter

TABLE 3

Brightness level distribution of image according to illumination when previewing object in current exposure (7.5 FPS)

| Brightness Level | [1×] | | | | | | | | | | | |
|---|---|---|---|---|---|---|---|---|---|---|---|---|
| | 10.31 | 12.5 | 14.8 | 17.4 | 20 | 31.7 | 43.5 | 85 | 107 | 155 | 191 | 344 |
| 0~19 | 0 | 0 | 0 | 0 | 0 | 0 | 0 | 0 | 0 | 0 | 0 | 0 |
| 20~39 | 0 | 0 | 0 | 0 | 0 | 0 | 0 | 0 | 0 | 0 | 0 | 0 |
| 40~59 | 1596 | 0 | 0 | 0 | 0 | 0 | 0 | 0 | 0 | 0 | 0 | 0 |
| 60~79 | 25870 | 5429 | 18 | 0 | 0 | 0 | 0 | 0 | 0 | 0 | 0 | 0 |
| 80~99 | 154 | 22273 | 20573 | 6684 | 4660 | 2 | 2 | 11 | 0 | 0 | 0 | 0 |
| 100~119 | 0 | 58 | 7176 | 20580 | 21162 | 9724 | 9728 | 9462 | 5774 | 4471 | 3301 | 5451 |
| 120~139 | 0 | 0 | 0 | 505 | 2003 | 15819 | 15372 | 14999 | 15113 | 13300 | 15956 | 13814 |
| 140~159 | 0 | 0 | 0 | 0 | 0 | 2096 | 2639 | 3085 | 6742 | 9547 | 8249 | 8580 |
| 160~179 | 0 | 0 | 0 | 0 | 0 | 0 | 0 | 0 | 0 | 0 | 0 | 0 |
| 180~199 | 0 | 0 | 0 | 0 | 0 | 0 | 0 | 0 | 0 | 0 | 0 | 0 |
| 200~219 | 0 | 0 | 0 | 0 | 0 | 0 | 0 | 0 | 0 | 0 | 0 | 0 |
| 220~239 | 0 | 0 | 0 | 0 | 0 | 0 | 0 | 0 | 0 | 0 | 0 | 0 |
| 240~255 | 0 | 0 | 0 | 0 | 0 | 0 | 0 | 0 | 0 | 0 | 0 | 0 |

First, the electronic shutter speed value 0×768 is compared to the threshold value 0×768 (S333). If the electronic shutter speed value 0×768 is greater than the threshold value 0×768, the current (first) image frame is determined as either bright (S336) or maintained (S337). If the electronic shutter speed speed value 0×768 is determined to be the same as the threshold value 0×768 in step S333 and the gain value 0×21 is determined to be less than the threshold value 0×39 in step S334, it is determined that the current image frame is dark (S338).

TABLE 4

Brightness level distribution of image according to illumination when previewing object in current exposure (3.75 FPS)

[1×]

| Brightness Level | 10.31 | 12.5 | 14.8 | 17.4 | 20 | 31.7 | 43.5 | 85 | 107 | 155 | 191 | 344 |
|---|---|---|---|---|---|---|---|---|---|---|---|---|
| 0~19 | 0 | 0 | 0 |  | 0 | 0 | 0 | 0 |  | 0 | 0 | 0 |
| 20~39 | 0 | 0 | 0 |  | 0 | 0 | 0 | 0 |  | 0 | 0 | 0 |
| 40~59 | 0 | 0 | 0 |  | 0 | 0 | 0 | 0 |  | 0 | 0 | 0 |
| 60~79 | 1 | 0 | 0 |  | 0 | 0 | 0 | 0 |  | 0 | 0 | 0 |
| 80~99 | 8903 | 12 | 3 |  | 12 | 0 | 3 | 0 |  | 0 | 0 | 0 |
| 100~119 | 18373 | 6913 | 10141 |  | 9363 | 3109 | 8627 | 4242 |  | 4772 | 3938 | 4364 |
| 120~139 | 0 | 18548 | 16419 |  | 15198 | 16044 | 15782 | 14131 |  | 14073 | 14939 | 14194 |
| 140~159 | 0 | 2246 | 1379 |  | 3177 | 8488 | 3130 | 9216 |  | 8781 | 8770 | 9057 |
| 160~179 | 0 | 0 | 0 |  | 0 | 0 | 0 | 0 |  | 0 | 0 | 0 |
| 180~199 | 0 | 0 | 0 |  | 0 | 0 | 0 | 0 |  | 0 | 0 | 0 |
| 200~219 | 0 | 0 | 0 |  | 0 | 0 | 0 | 0 |  | 0 | 0 | 0 |
| 220~239 | 0 | 0 | 0 |  | 0 | 0 | 0 | 0 |  | 0 | 0 | 0 |
| 240~255 | 0 | 0 | 0 |  | 0 | 0 | 0 | 0 |  | 0 | 0 | 0 |

The count is incremented (S350) only if the illumination for the current image frame determined according to a distribution of brightness levels (S320) coincides with the illumination for the current image frame determined according to the electronic shutter speed and gain values (S330). If the illumination determined according to the electronic shutter speed and gain values (S330) differs from the illumination determined according to a distribution of brightness levels (S320), the count will not be incremented.

In determining the illumination for the current (first) image frame, the determination according to the brightness level distribution (S320) and the determination according to the electronic shutter speed value and the gain value (S330) coincide in that both determinations yield that the current (first) image frame is dark (S340). Therefore a count of the number of times of coincidence of the determinations is incremented (S350).

TABLE 5

Electronic shutter speed value and gain values of camera sensor when current exposure is 15 FPS

| Illumination [Lux] | Shutter speed value 32/33 [h] | Gain value 36 [h] |
|---|---|---|
| 10.3 | 0 × 768 | 0 × 17 |
| 12.3 | 0 × 768 | 0 × 1c |
| 14.8 | 0 × 768 | 0 × 1e |
| 17.4 | 0 × 768 | 0 × 1f |
| 20 | 0 × 768 | 0 × 21 |
| 31.7 | 0 × 768 | 0 × 2d |
| 43.5 | 0 × 768 | 0 × 39 |
| 85 | 0 × 03B4 | 0 × 44 |
| 107 | 0 × 03B4 | 0 × 44 |
| 155 | 0 × 013C | 0 × 44 |
| 191 | 0 × 013C | 0 × 4b |
| 344 | 0 × 013C | 0 × 4a |

The determination of the illumination according to the brightness level distribution (S320) and according to the electronic shutter speed value and the gain value (S330) is performed for each of the remaining frames (frames 4, 7, 10, and 13). After completing the determination of the illumination according to the brightness level distribution (S320) and according to the electronic shutter speed value and the gain value (S330) for each of the frames, it is determined if the count of coinciding determinations is equal to or greater than three (S420) and, if so, the exposure is automatically adjusted (S440).

In the present example, when it is determined that the image previewed in the current normal exposure (15 FPS) is under low illumination (20 Lux), the normal exposure (15 FPS) is automatically adjusted to a longer exposure, such as the long exposure (7.5 FPS) in step S400. After the exposure (7.5 FPS) is adjusted to be suitable for the current illumination (20 Lux) of the object under control of the MPU program (S400), the camera of the camera phone again previews the object using the adjusted exposure (7.5 FPS) (S100) and the user may photograph the previewed object (S140). If the determinations (S320, S330) performed with respect to the frames (1, 4, 7, 10, and 13) do not coincide more than three times, the current exposure is determined to be an appropriate exposure (S420) and the exposure is not adjusted but rather maintained as 15 FPS.

The previous example illustrates the case where the normal exposure (15 FPS) is adjusted to the long exposure (7.5 FPS). Next, the case where the normal exposure (15 FPS) is adjusted to the extra long exposure (3.75 FPS) when the object is at low illumination (10.31 Lux) will be explained.

Figure 9:
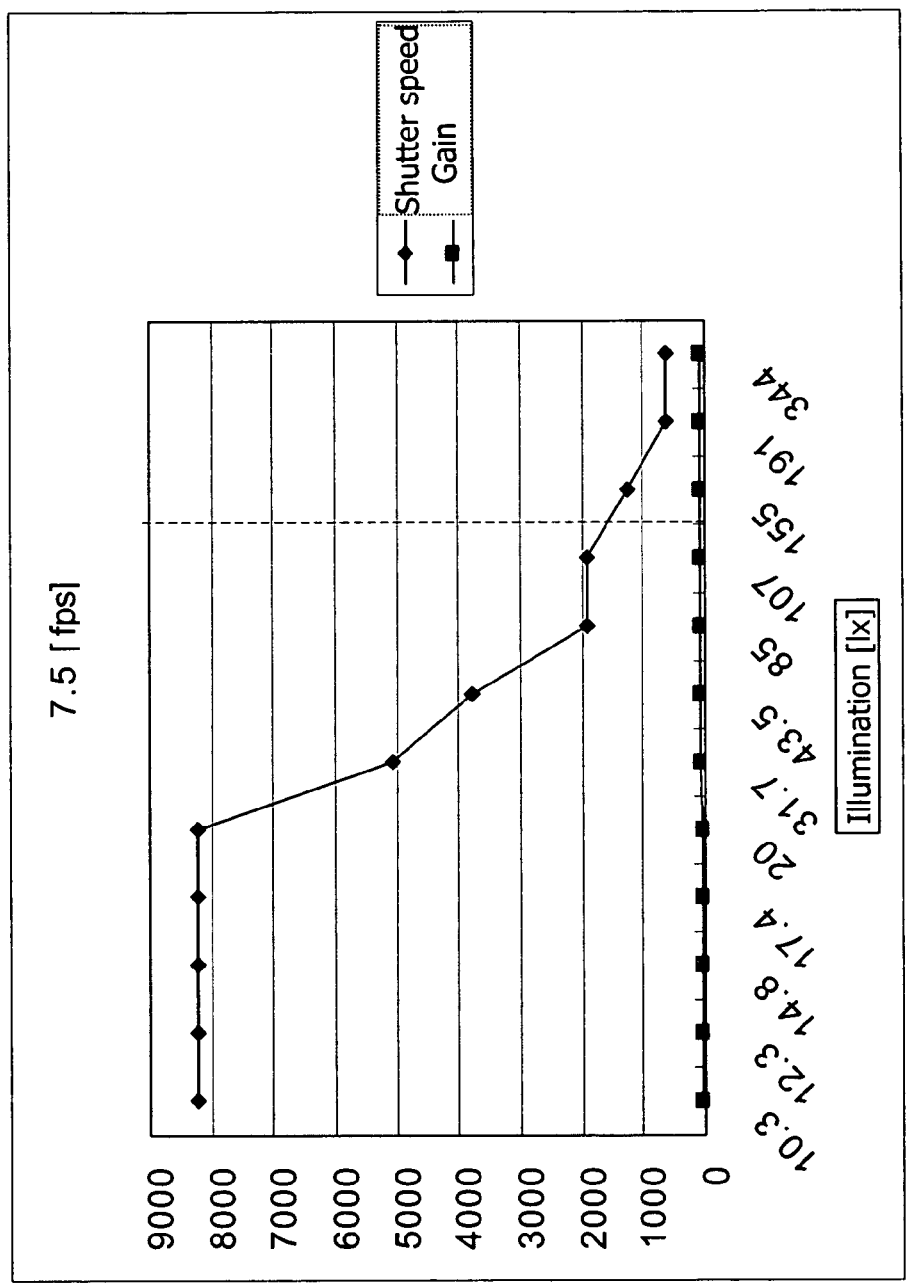
FIG. 9 is a graph showing electronic shutter speed values and gain values of a sensor according to illumination of a previewed image when a current exposure is 7.5 FPS.

Table 3 shows a brightness level distribution of an image according to the illumination when previewing the object under the current exposure (7.5 FPS). FIG. 6 is a distribution chart of brightness levels that graphically shows the data of Table 3. Table 6 shows hexadecimal electronic shutter speed values and gain values that change according to the illumination based on characteristics of the camera sensor in the current exposure (15 FPS). FIG. 9 is a graph in which the horizontal axis represents the illumination level (Lux) and the vertical axis represents hexadecimal values adjusted into decimal values. Tables 3 and 6 will be explained with reference to FIGS. 2, 4, 5, 6, 8, and 9.

First, as done in the previous example, the current exposure is adjusted from the normal exposure (15 FPS) to the long exposure (7.5 FPS). The camera of the camera phone previews the object again in the current adjusted exposure (7.5 FPS).

When the user determines not to take a photograph of the previewed image (S120), the MPU program extracts three frames (frames 1, 3, and 5) for determining the illumination from the previewed image (S220). Then, as in the previous example, the illumination of each frame (frames 1, 3, and 5)

is determined according to the brightness level distribution (S320) and according to the electronic shutter speed value and the gain value (S330).

The illumination according to the brightness level distribution (S320) is determined by analyzing a brightness level distribution of using a threshold value of 120. Next, the illumination of each frame is determined according to the electronic shutter speed value and the gain value (S330) using threshold values of 0x4f0 and 0x4c. The threshold value, which is obtained experimentally, corresponds to an illumination of 155 Lux, which generally appears to be bright.

Preferably, as shown in Table 3 and FIG. 6, more than 83% of the brightness levels corresponding to the current illumination (10.31 Lux) of the object are distributed on the left side based on the threshold value of 120, thereby indicating that the current (first) image (first frame) is dark (S329). Next, as shown in Table 6 and FIG. 9, an electronic shutter speed value 0x2018 of the sensor corresponding to the current illumination (10.31 Lux) is greater than the threshold value of 0x04f0 (S333) and a gain value 0x22 of the sensor corresponding to the current illumination is less than the threshold value of 0x04f0 (S334), and thus the image is determined as a dark image (S338).

TABLE 6

Electronic shutter speed values and gain values of camera sensor when current exposure is 7.5 FPS

| Illumination [Lux] | Shutter speed value 32/33 h | Gain value 36 [h] |
|---|---|---|
| 10.3 | 0 × 2018 | 0 × 22 |
| 12.3 | 0 × 2018 | 0 × 2a |
| 14.8 | 0 × 2018 | 0 × 30 |
| 17.4 | 0 × 2018 | 0 × 35 |
| 20 | 0 × 2018 | 0 × 38 |
| 31.7 | 0 × 13c0 | 0 × 44 |
| 43.5 | 0 × 0ed0 | 0 × 45 |
| 85 | 0 × 0768 | 0 × 45 |
| 107 | 0 × 0768 | 0 × 49 |
| 155 | 0 × 04f0 | 0 × 4c |
| 191 | 0 × 0278 | 0 × 4c |
| 344 | 0 × 0278 | 0 × 4b |

Therefore, each determination of the illumination (S320, S330) with respect to the current (first) image frame is determined as coinciding as a dark image (S340), and count of coinciding determinations is incremented (S350). When the determinations (S320, S330) are performed by analyzing the data extracted from the other extracted frames (frames 3 and 5) and the count of coinciding determinations is determined greater than or equal to three (S420), the illumination of the current object is determined as being in a low illumination state and the MPU program automatically adjusts the current exposure (7.5 FPS) to a longer exposure, such as the extra long exposure (3.75 FPS).

The camera of the camera phone again previews the object using the adjusted exposure (3.75 FPS). The user can then press a key button of the input/output unit of the camera phone to photograph the previewed object (S140). When adjusting the current normal exposure (15 FPS) to the extra long exposure (3.75 FPS), the current normal exposure (15 FPS) is adjusted to the long exposure (7.5 FPS), and then the long exposure (7.5 FPS) is adjusted to the extra long exposure (3.75 FPS) through the same procedure as in the previous example.

Figure 10:
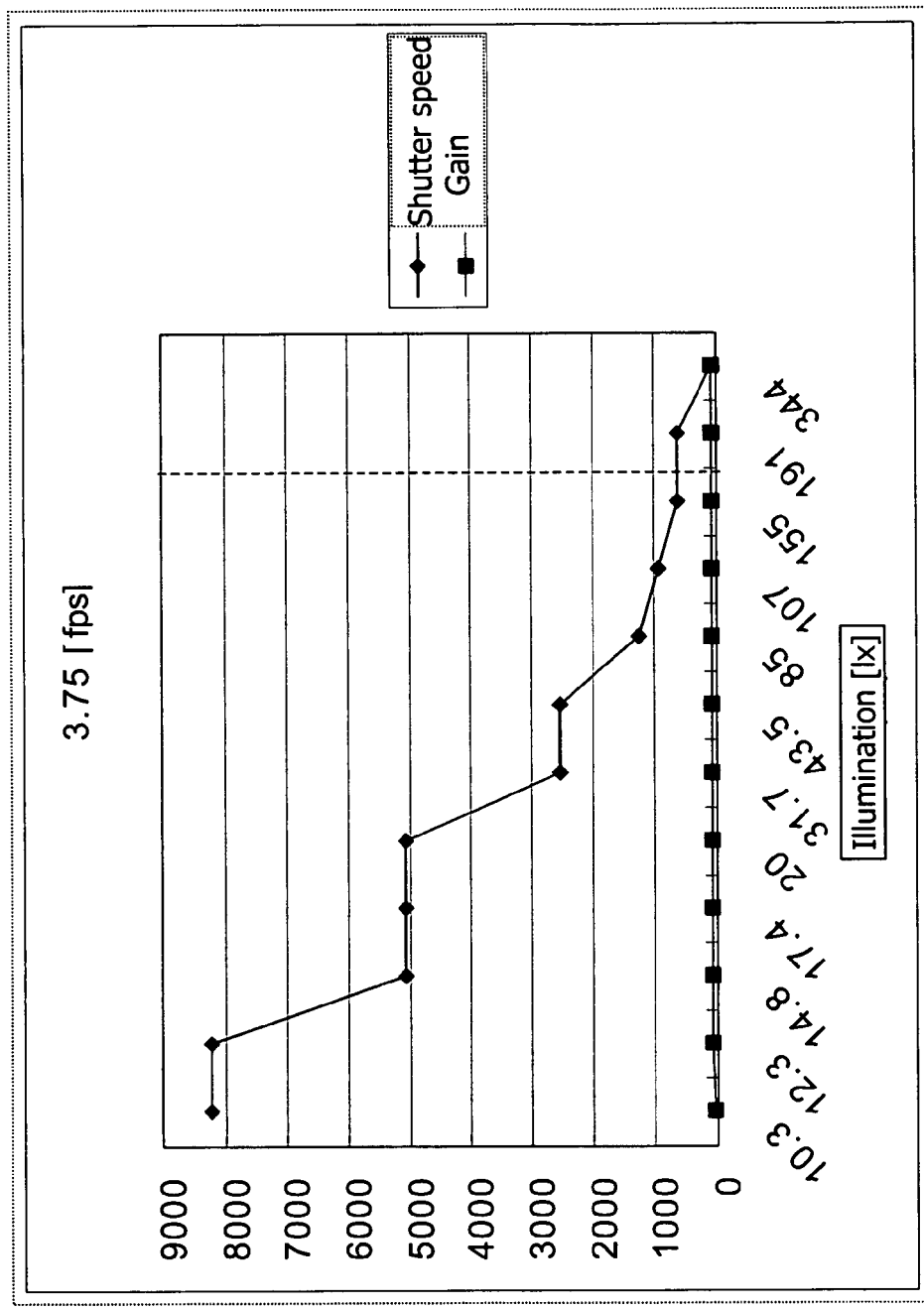
FIG. 10 is a graph showing electronic shutter speed values and gain values of a sensor according to illumination of a previewed image when a current exposure is 3.75 FPS.

Table 4 shows a brightness level distribution of an image according to illumination when previewing the object in the current exposure (3.75 FPS), and FIG. 7 is a distribution chart of brightness levels graphically showing the data of Table 4. Table 7 shows hexadecimal electronic shutter speed values and gain values which change according to the illumination based on characteristics of the camera sensor in the current exposure (3.75 FPS). FIG. 10 is a graph in which the horizontal axis represents illumination (Lux) and the vertical axis represents hexadecimal values converted into decimal values on the basis of the data in Table 7.

Referring to Tables 4 and 7, and FIGS. 2, 4, 7, and 10, an embodiment in which the currently set extra long exposure 3.75 FPS is adjusted into a shorter exposure, such as the long exposure (7.5 FPS) or the normal exposure (15 FPS), in order to photograph the object will be explained. The MPU program extracts the first, second and third frames from the previewed image (S220) using the 3.75 FPS exposure and determines the illumination for each extracted frames (S300).

In determining the illumination according to the brightness level distribution for each frame (S320) and determining the illumination according to the electronic shutter speed values and gain values of the camera sensor for each frame (S330), the MPU program determines the illumination of the first, second and third frames based on respective threshold values of 119, 0x0278 and 0x4b corresponding to the illumination of 191 Lux. The illumination (191 Lux) is a standard for the threshold values obtained experimentally and such an illumination level is brighter than a normal illumination level. When comparing the threshold illumination level with the illumination of 155 Lux, the illumination of 191 Lux is difficult to distinguish with the naked eye.

An embodiment in which a current exposure (15 FPS) is adjusted to a longer exposure, such as the long exposure (7.5 FPS) or the extra long exposure (3.75 FPS), has been explained previously. However, the current exposure can be adjusted to each exposure proposed in the algorithm shown in Table 1 by the method explained with reference to FIGS. 2 and 4.

TABLE 7

Electronic shutter speed values and gain values of camera sensor when current exposure is 3.75 FPS

| Illumination [Lux] | Shutter speed Value 32/33 h | Gain Value 36 [h] |
|---|---|---|
| 10.3 | 0 × 0218 | 0 × 36 |
| 12.3 | 0 × 0218 | 0 × 40 |
| 14.8 | 0 × 13c0 | 0 × 45 |
| 17.4 | 0 × 13c0 | 0 × 45 |
| 20 | 0 × 13c0 | 0 × 45 |
| 31.7 | 0 × 09e0 | 0 × 4b |
| 43.5 | 0 × 09e0 | 0 × 4b |
| 85 | 0 × 04f0 | 0 × 4b |
| 107 | 0 × 03b4 | 0 × 4b |
| 155 | 0 × 0278 | 0 × 4b |
| 191 | 0 × 0278 | 0 × 4b |
| 344 | 0 × 013c | 0 × 4b |

In other cases, the threshold value, which is a standard value for determining the illumination in the process of adjusting the exposure, is set differently for the current exposures (15 FPS, 7.5 FPS, and 3.75 FPS), respectively. This indicates that an appropriate margin is made between the threshold values as the standard value for determining the illumination. Provision of such a margin may prevent a malfunction in which a previewed image of a specific object at illumination corresponding to a specific threshold value frequently varies between two exposures.

For example, when determining whether the current normal exposure (15 FPS) is to be adjusted to the long exposure (7.5 FPS), as shown in FIG. 5, the threshold value for the brightness level distribution of the current exposure (15 FPS) is 100. Conversely, when determining whether the current long exposure (7.5 FPS) is to be adjusted to the normal exposure (15 FPS), as shown in FIG. 6, the threshold value of the brightness level distribution of the current exposure (7.5 FPS) is 120. Therefore, because a margin of at least 20 is provided between the threshold values by brightness level units, a malfunction caused by frequently moving between the exposures (15 FPS and 7.5 FPS) may be prevented. In addition, such a margin is also provided for the threshold values in the electronic shutter speed values and gain values of the camera sensor, and may further prevent the malfunction as well.

As described above, in the present invention, when photographing an object while the illumination level is changed at any time according to the peripheral environment, the exposure can automatically be adjusted into an optimal exposure. Since it is very advantageous to photograph an image with an increased image quality, specifically when photographing an object under a condition of low illumination, it is possible to photograph an image while maintaining an optimal image quality.

Furthermore, a sudden movement of an object may be focused and photographed quickly and simply without requiring a manual adjustment of an exposure. Moreover, because the present invention checks the current illumination by extracting a brightness level distribution obtained from a previewed image as well as by electronic shutter speed values and gain values in the camera sensor, a separate optical sensor is not required, thereby simplifying the design of a camera phone to implement the method according to the present invention and allowing the size of the device to be minimized so as to additionally achieve a reduction in production cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for adjusting an exposure of a camera for photographing an object, the method comprising:
previewing an image of the object with a current exposure, the previewed image comprising one or more frames;
extracting data from at least one of the one or more frames of the previewed image, the data related to illumination of the object;
determining illumination of the object according to the extracted data;
maintaining a count of the number of times that a determined first illumination matches a determined second illumination if the extracted data is from a plurality of frames; and
adjusting the exposure according to the determined illumination.

2. The method of claim 1, wherein the extracted data comprises at least one of brightness level distribution of the previewed image, electronic shutter speed of a camera image sensor and a gain value of the camera image sensor.

3. The method of claim 1, wherein the data is extracted from each of the one or more frames of the previewed image and the illumination of each of the one or more frames is determined by analyzing the extracted data.

4. The method of claim 1, wherein the data is extracted from a subset of the one or more frames of the previewed image and the illumination of each of the subset of the one or more frames is determined by analyzing the extracted data.

5. The method of claim 1, wherein the illumination of the object is determined according to at least one threshold value as one of bright, dark and maintain current exposure.

6. The method of claim 5, wherein the at least one threshold value is set according to a current exposure of the previewed image.

7. The method of claim 1, further comprising extracting a plurality of types of data from at least one of the one or more frames of the previewed image, the plurality of types of data related to illumination of the object, and determining illumination of the object according to the plurality of types of data for at least one of the frames from which the data is extracted.

8. The method of claim 7, wherein the exposure is adjusted if the illumination determined according to each of the plurality of types of data coincide for at least one of the one or more frames of the previewed image.

9. The method of claim 7, wherein the exposure is maintained if the illumination determined according to each of the plurality of types of data does not coincide for at least one of the one or more frames of the previewed image.

10. The method of claim 8, wherein the plurality of types of data are extracted from the plurality of frames of the previewed image and illumination is determined according to the plurality of types of data for at least two of the plurality of frames, and further comprising adjusting the exposure if the count of the number of times that the determined first illumination matches the determined second illumination is one of greater and equal to a predetermined number.

11. The method of claim 10, wherein the exposure is adjusted if a number of times that the illumination determined according to each of the plurality of types of data coincides in consecutive frames is one of greater and equal to a predetermined number.

12. The method of claim 10, wherein a current exposure is maintained if the determined number of times is less than the predetermined number.

13. The method of claim 7, wherein the illumination of the object according to the plurality of types of data is determined for each of the frames from which the data is extracted.

14. The method of claim 7, wherein the illumination of the object according to the plurality of types of data is determined for a subset of the frames from which the data is extracted.

15. The method of claim 7, the plurality of types of data comprising a brightness level distribution of the previewed image, an electronic shutter speed of a camera image sensor and a gain value of the camera image sensor and wherein the first determination of the illumination of the object as one of bright, dark and maintain current exposure is performed according to the brightness level distribution using a first threshold value and the second determination of the illumination of the object as one of bright, dark and maintain current exposure is performed according to the electronic shutter speed and gain value of the camera image sensor using a second threshold value, the first determination and second determination performed for at least one of the frames from which the plurality of types of data is extracted such that a count is incremented whenever the first determination matches the second determination for any of the at least one of the frames, the exposure is adjusted if the count is one of greater than and equal to a predetermined number, and the exposure is maintained if the count is less than the predetermined number.

16. A method for adjusting an exposure of a camera for photographing an object, the method comprising:
previewing an image of the object with a current exposure, the previewed image comprising one or more frames;
extracting a first illumination indicator from at least one of the one or more frames of the previewed image;
extracting a second illumination indicator from the at least one of the one or more frames of the previewed image;
determining a first illumination of the object for the at least one of the one or more frames according to the first illumination indicator;
determining a second illumination of the object for the at least one of the one or more frames according to the second illumination indicator;
maintaining a count of the number of times that the determined first illumination matches the determined second illumination for one of the one or more frames; and
adjusting the exposure according to the count.

17. The method of claim 16, wherein the first illumination indicator is a brightness level distribution.

18. The method of claim 16, wherein the second illumination indicator is an electronic shutter speed and gain value of a camera image sensor.

19. The method of claim 16, wherein the first illumination indicator is analyzed according to a brightness level distribution of each pixel of the at least one of the one or more frames using a first preset threshold value and the second illumination indicator is analyzed according to an electronic shutter speed value and gain value of a camera image sensor corresponding to the at least one of the one or more frames using a second preset threshold value.

20. The method of claims 19, wherein the first threshold value and the second threshold value are set differently according to a current exposure of the previewed image.

21. The method of claim 16, wherein the first illumination indicator and second illumination indicator are extracted from each of the one or more frames of the previewed image and the first illumination and second illumination are determined for each of the one or more frames.

22. The method of claim 16, wherein each of the first illumination and the second illumination is determined as one of bright, dark and maintain current exposure.

23. The method of claim 16, wherein the exposure is adjusted if the count is one of greater than and equal to a predetermined number.

24. The method of claim 16, further comprising maintaining a count of the number of times that the determined first illumination matches the determined second illumination in consecutive frames of the one or more frames and wherein the exposure is adjusted if the count is one of greater than and equal to a predetermined number.

25. The method of claim 16, wherein a current exposure is maintained if the count is less than a predetermined number.

26. A camera phone, comprising:
a memory device for storing images of an object;
an LCD for displaying information related to a photographed object;
an input/output unit for allowing a user to input or receive information related to the photographed object; and
a microprocessor unit configured to perform a program in order to preview an image of the object with a current exposure, the previewed image comprising one or more frames, extract data from the previewed image of the object, the data related to illumination of the object, determine illumination of the object according to the extracted data, adjust the exposure according to the determined illumination, and maintain a count of the number of times that a determined first illumination matches a determined second illumination if the extracted data is from a plurality of frames.

27. The camera phone of claim 26, wherein the extracted data comprises at least one of brightness level distribution of the previewed image, electronic shutter speed of a camera image sensor and a gain value of a camera image sensor.

28. The camera phone of claim 26, wherein the microprocessor unit is further configured to extract the data from each of the one or more frames of the previewed image and determine the illumination of each of the one or more frames by analyzing the extracted data.

29. The camera phone of claim 26, wherein the microprocessor unit is further configured to extract the data from a subset of the one or more frames of the previewed image and determine the illumination of each of the subset of the one or more frames by analyzing the extracted data.

30. The camera phone of claim 26, wherein the microprocessor unit is further configured to determine the illumination of the object according to at least one threshold value as one of bright, dark and maintain current exposure.

31. The camera phone of claim 30, wherein the microprocessor unit is further configured to set the at least one threshold value according to a current exposure of the previewed image.

32. The camera phone of claim 26, wherein the microprocessor unit is further configured to extract a plurality of data from at least one of the one or more frames of the previewed image, the plurality of data related to illumination of the object, and configured to determine illumination of the object according to the plurality of data for at least one of the frames from which the data is extracted.

33. The camera phone of claim 32, wherein the microprocessor unit is further configured to adjust the exposure if the illumination determined according to each of the plurality of data coincide for at least one of the one or more frames of the previewed image.

34. The camera phone of claim 32, wherein the microprocessor unit is further configured to maintain the exposure if the illumination determined according to each of the plurality of data does not coincide for at least one of the one or more frames of the previewed image.

35. The camera phone of claim 32, wherein the microprocessor unit is further configured to extract the plurality of data from a plurality of frames of the previewed image, determine illumination according to the plurality of data for at least two of the plurality of frames, determine a number of times that the illumination determined according to each of the plurality of data coincides in any of the at least two frames, and adjust the exposure if the determined number of times is one of greater and equal to a predetermined number.

36. The camera phone of claim 35, wherein the microprocessor unit is further configured to adjust the exposure if a number of times that the illumination determined according to each of the plurality of data coincides in consecutive frames is greater or equal to a predetermined number.

37. The camera phone of claim 35, wherein the microprocessor unit is further configured to maintain a current exposure if the number of times that the illumination determined according to each of the plurality of data coincide is less than the predetermined number.

38. The camera phone of claim 35, wherein the microprocessor unit is further configured to determine the illumination of the object according to the plurality of data for each of the frames from which the data is extracted.

39. The camera phone of claim 35, wherein the microprocessor unit is further configured to determine the illumination of the object according to the plurality of data for a subset of the frames from which the data is extracted.

40. The camera phone of claim 32, wherein the plurality of data comprises a brightness level distribution of the previewed image, an electronic shutter speed of a camera image sensor, and a gain value of the camera image sensors, and wherein the microprocessor unit is further configured to perform a first determination of the illumination of the object as one of bright or dark and maintain current exposure according to the brightness level distribution using a first threshold value and perform a second determination of the illumination of the object as one of bright or dark and maintain current exposure according to the electronic shutter speed and gain value of the camera image sensor using a second threshold value, the first determination and second determination performed for at least one of the frames from which the plurality of types of data is extracted, further adapted to increment a count whenever the first determination matches the second determination for any of the at least one of the frames, and further configured to adjust the exposure if the count is greater than or equal to a predetermined number, and to maintain the exposure if the count is less than the predetermined number.

* * * * *